Figure 1:
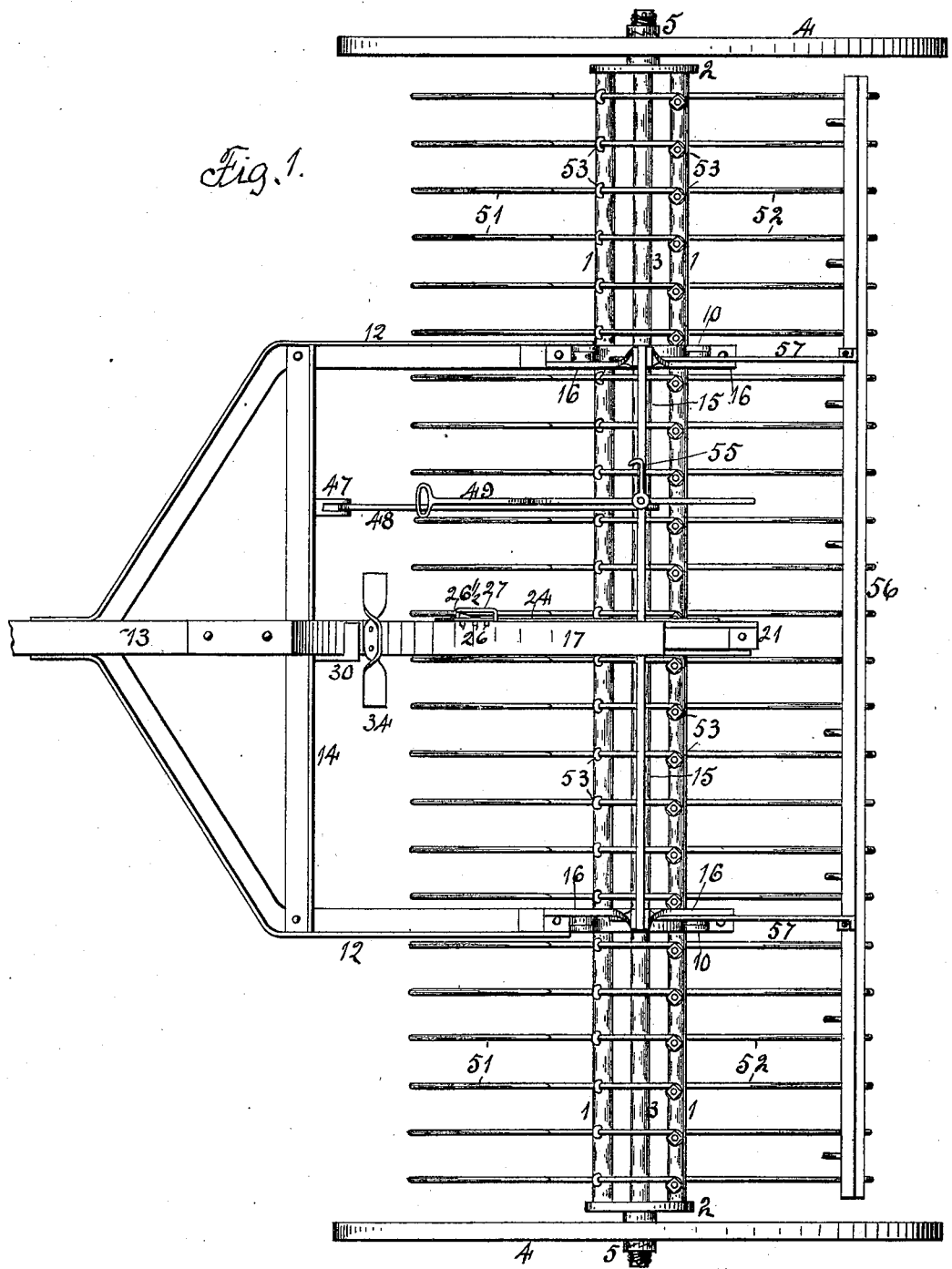

No. 635,550. Patented Oct. 24, 1899.
C. E. JACKSON.
HORSE HAY RAKE.
(Application filed June 10, 1899.)
(No Model.) 3 Sheets—Sheet 1.

Witnesses:
W. J. Behel
J. M. Behel

Inventor:
Charles E. Jackson.
By A. O. Behel
Atty.

No. 635,550. Patented Oct. 24, 1899.
C. E. JACKSON.
HORSE HAY RAKE.
(Application filed June 10, 1899.)
(No Model.) 3 Sheets—Sheet 2.
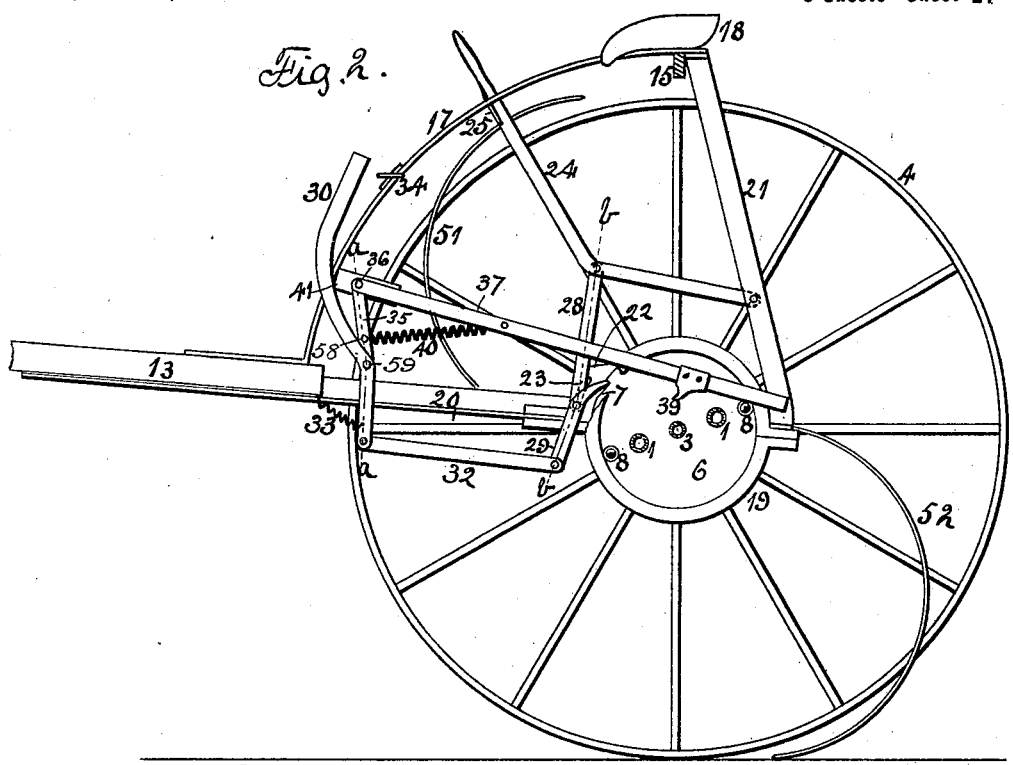

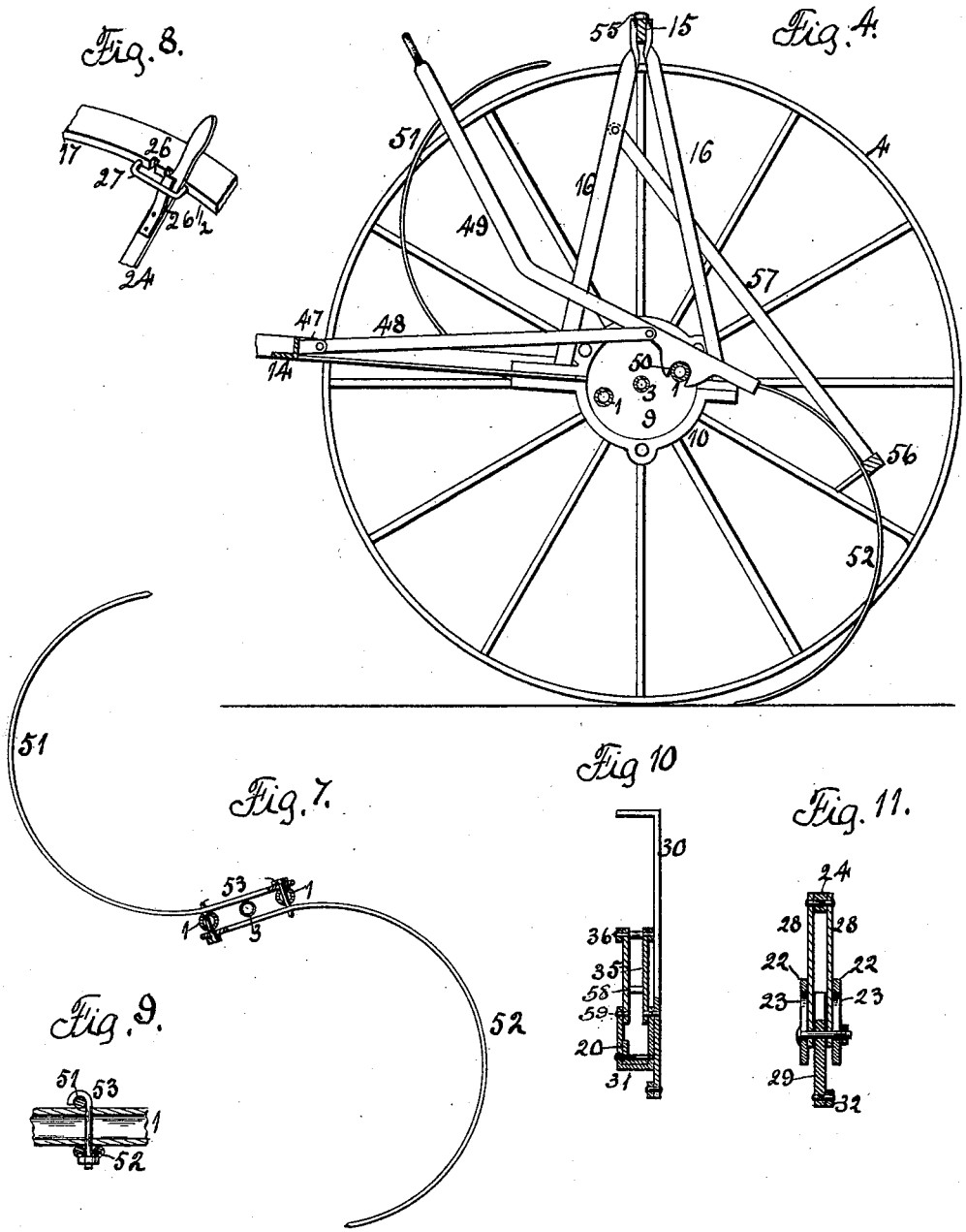

UNITED STATES PATENT OFFICE.

CHARLES E. JACKSON, OF ROCKFORD, ILLINOIS.

HORSE HAY-RAKE.

SPECIFICATION forming part of Letters Patent No. 635,550, dated October 24, 1899.

Application filed June 10, 1899. Serial No. 720,062. (No model.)

*To all whom it may concern:*

Be it known that I, CHARLES E. JACKSON, a citizen of the United States, residing at Rockford, in the county of Winnebago and State of Illinois, have invented certain new and useful Improvements in Horse Hay-Rakes, of which the following is a specification.

The object of this invention is to store up power which when liberated will dump the rake.

The further object of this invention is to provide a rake with a double set of teeth which are revoluble.

In the accompanying drawings, Figure 1 is a plan view of a horse hay-rake embodying my improvements. Fig. 2 is a transverse vertical section showing the mechanism for dumping the rake. Fig. 3 is a vertical transverse section showing the mechanism for storing spring-power to dump the rake. Fig. 4 is a vertical transverse section showing the hand-lever arrangement for dumping the rake. Fig. 5 is a vertical section of one of the outer supports of the tongue-frame. Fig. 6 is a face representation of the center disk supported by the rake-head. Fig. 7 is a vertical transverse section of the main frame and rake-teeth, showing the manner of connecting the teeth. Fig. 8 is an isometrical representation of the upper portion of the lever for adjusting the teeth. Fig. 9 is a lengthwise section of one of the tooth-supports, showing the manner of connecting the teeth. Fig. 10 is a vertical section on dotted line $a$, Fig. 2. Fig. 11 is a vertical section on dotted line $b$, Fig. 2.

So far as known to me horse-rakes have been dumped by the team when the operator makes a connection between the rake-head and rotating part of the rake, and in another form of rake the dumping is done by the operator moving a hand or foot lever, while in my construction the dumping is done by stored power which is liberated by the operator.

My improved horse hay-rake consists of the rake-head composed of pipes 1, secured in ends 2. This head is supported upon an axle 3, passing centrally through the ends 2 and turning freely therein. Upon the axle are located wheels 4, each having a connection therewith through the clutch 5 in order that the wheels will revolve the axle when going forward and allow it to remain stationary when the wheels revolve backward.

To the lengthwise center of the rake-head is secured a disk 6, having two peripheral notches 7 and supporting two rollers 8 on one face. This rake-head also supports two disks 9, one located at each side of the central disk nearer the supporting-wheels. A casing 10 surrounds the disks 9 and supports three rollers 11, which roll in contact with the periphery of the disks. These casings are in two parts, between which are located the branches 12 of the frame connected to the tongue 13. A cross-bar 14 serves to brace the forward portion of the frame. A bar 15 extends in the lengthwise direction of the rake-head and is held elevated by vertical standards 16, secured to the casings 10. A curved bar 17 has its lower end secured to the upper face of the tongue, and its upper end rests upon the lengthwise bar 15. A seat 18 is supported by the upper end of the curved bar.

A casing 19 surrounds the central disk 6, its forward end connected to the tongue by the bar 20 and its rear end supported by the bar 21, depending from the upper end of the curved bar 17. The front face of the casing 19 is cut away and is provided with ears 22, having vertical slots 23. A lever 24 has a pivotal connection with the depending brace-bar 21, its upper end provided with a rib 25, adapted to enter the notches 26 in the edge of the curved bar 17, and a spring 26½, secured to the handle and bearing against the loop 27, serves to hold the rib in the notches. To this lever are pivoted two bars 28, their lower ends having a connection with the vertical slots 23 and adjustable therein. A dog 29 is pivotally supported by the lower ends of the bars 28, its upper end being adapted to enter the notches 7 in the periphery of the central disk 6.

A foot-lever 30 has a pivotal connection with a bracket 31, secured to the bar 20. The lower end of this foot-lever has a connection with the dog 29 through the link 32, and a spring 33 holds the dog in engagement with the central disk. A foot-rest 34 is secured to the curved bar 17 in close proximity to the foot-lever 30. To the upper end of the bracket 31 are pivotally secured two braces 35, forming a yoke and held separated by cross-rods 36, 58, and 59. To the upper end of the yoke are pivotally connected two arms 37 and 38, one located each side of the casing of the central disk. The arm 37 rests upon one of the rollers 8 and supports a hook 39. A coiled spring 40 is located between the yoke and arms 37 and 38 and has a connection with both. To the forward end of the arm 38 is pivoted a block 41, and a slot 42 permits the adjustment of the arm. To the yoke about midway of its length is pivoted an arm 43, having an upwardly-curved forward end 44 and its rear end 45 made in hook form. A loop 46 limits the downward movement of the arm.

To the cross-bar 14 is secured a bracket 47, and to the bracket is pivotally connected an arm 48, and to its free end is pivoted a hand-lever 49, having a recess 50 in its under face.

Two sets of rake-teeth 51 and 52 are employed and secured to the rake-head by means of hook-bolts 53, the bolt passing around the shank of a tooth of one set and through the eye of a tooth of the other set receiving a nut on its projecting end.

The several figures of the drawings represent the parts in the position they occupy after the rake has been dumped, and the further advance movement of the rake will rotate the axle and also the two-armed projection 54, secured thereto. One prong of this projection will engage the hooked end 45 of the lever and move it in its lengthwise direction, which will move the yoke, to which it is pivotally connected. The movement of this yoke will move the bars 37 and 38 rearward until the hooked projection 39 moves over one of the rollers 8, carried by the central disk 6, when the arm 43 will become disengaged from its connection with the projection 54 and fall out of the reach of the projections and lengthwise tubes when the axle and rake-head revolve. This movement of the bars 37 and 38 will extend the spring 40, thereby increasing its force, and when the arm 43 drops the hooked projection 39 will engage one of the rollers 8, and as the dog 29 is in engagement with one of the notches 7 of the central disk the disk will be held stationary against the force of the spring. When the teeth have gathered sufficient hay, the attendant with his feet moves the lever 30 until the dog 29 is free of the central disk 6, which will allow the spring 40 to exert its force sufficiently to rotate the rake-head one-half a revolution and raise the teeth free of the hay and lower the other set of teeth just in advance of the windrow, when the dog will engage the central disk and hold it stationary. The operation of storing the spring-power will be completed in about six feet advance of the rake after the load has been dropped, so that if need be the rake can be operated every six feet. When the block 41, pivoted to the arm 38, is in the position shown in solid lines, Fig. 3, the curved end 44 of the arm 43 will come in contact with it when the spring-dump is used, which will bring the hooked end 45 of the arm 43 within reach of the revolving projection of the arm 54 and will be moved thereby, as before described. When a hand-dump is used, it is necessary that the arm 43 should remain at rest and out of the reach of the revolving arm 54. This is accomplished by adjusting the block 41 so that the curved end 44 of the arm 45 will rise higher, consequently allowing the hooked end 45 to drop and remain out of reach of the revolving arm 54, and in transportation the hand-lever can be held by the rod 55, so that the teeth are raised free of the ground.

A cleaner 56 is suspended by the bars 57 from the vertical supports 16 and rest in contact with the rake-teeth.

By means of the lever 24 the dog 29 is moved bodily in a vertical direction, which will regulate the pressure of the teeth upon the ground, as the stationary section of the central disk will be changed to throw the teeth nearer to or farther from the line of the points of contact of the driving-wheels with the ground.

I claim as my invention—

1. In a hay-rake, the combination of a rake-head capable of a rotary movement, a rotating axle, two sets of teeth supported by the head, a spring, a connection between the spring and rake-head and between the spring and axle.

2. In a hay-rake, a rake-head capable of a rotary movement, a rotating axle, a spring, a connection between the spring and rake-head and between the spring and axle by means of which the tension of the spring is increased and exerts its influence upon the rake-head.

3. In a hay-rake, a rake-head capable of a rotary movement, a revolving axle, a spring, a connection between the spring and rake-head, and between the spring and axle, by means of which the tension of the spring is increased, a movable stop for the rake-head and a lever for releasing the stop.

4. In a hay-rake, the combination of a rake-head capable of a rotary movement, a rotating axle, two sets of teeth supported by the head, a spring, a connection between the spring and rake-head and between the spring and axle, an adjustable stop for the rake-head and a lever for releasing the stop.

5. In a hay-rake, the combination of a rake-head, capable of a rotary movement, a rotating axle, a spring, a movable lever adapted to engage the rake-head, the spring exerting its force upon the lever, and an arm having a connection with the lever and adapted to be moved by the axle.

6. In a hay-rake, the combination of a rake-head, capable of a rotary movement, a rotating axle, a spring, a movable lever adapted to engage the rake-head, the spring exerting its force upon the lever, an arm having a pivotal connection with the lever and adapted to be moved by the axle, a movable block holding the arm in position to be moved by the axle and a hand-lever for dumping the rake-head.

CHARLES E. JACKSON.

Witnesses:
S. K. JACKSON,
A. O. BEHEL.